United States Patent [19]

Arakawa et al.

[11] Patent Number: 4,977,327

[45] Date of Patent: Dec. 11, 1990

[54] RADIATION IMAGE STORAGE PANEL

[75] Inventors: Satoshi Arakawa; Masamitu Nonomura; Makoto Ogoda; Shumpeita Torii; Katsuhiro Kohda, all of Kaisei, Japan

[73] Assignee: Fuji Photo Film Co., Ltd., Minami-ashigara, Japan

[21] Appl. No.: 380,682

[22] Filed: Jul. 14, 1989

Related U.S. Application Data

[63] Continuation of Ser. No. 918,356, Oct. 14, 1986, abandoned.

[30] Foreign Application Priority Data

| | | | |
|---|---|---|---|
| Oct. 14, 1985 | [JP] | Japan | 60-228418 |
| Oct. 14, 1985 | [JP] | Japan | 60-228419 |
| Oct. 13, 1986 | [JP] | Japan | 61-242795 |

[51] Int. Cl.[5] ............................ B32B 5/16; H01J 1/70

[52] U.S. Cl. .................................................. 250/484.1

[58] Field of Search ..................... 250/483.1, 484.1 R, 250/484.1 A, 484.1 B, 327.2 R, 327.2 A

[56] References Cited

U.S. PATENT DOCUMENTS

| | | | |
|---|---|---|---|
| 3,933,516 | 1/1976 | Mackey | 430/530 |
| 4,090,085 | 5/1978 | Shimiya et al. | 250/483.1 |
| 4,645,721 | 2/1987 | Arakawa et al. | 250/483.1 |
| 4,665,003 | 5/1987 | Matsuda et al. | 250/484.1 |
| 4,728,583 | 3/1988 | Yamazaki et al. | 250/327.2 A |

FOREIGN PATENT DOCUMENTS

| | | |
|---|---|---|
| 2304150 | 8/1974 | Fed. Rep. of Germany . |
| 2638768 | 3/1977 | Fed. Rep. of Germany . |

*Primary Examiner*—Jack I. Berman

*Attorney, Agent, or Firm*—Sixbey, Friedman, Leedom & Ferguson

[57] ABSTRACT

A radiation image storage panel comprising a support made of plastic film or paper and a phosphor layer provided on the support which comprises a binder and a stimulable phosphor dispersed therein, characterized in that an antistatic layer which comprises a conductive material is provided on the surface of the support not facing the phosphor layer, or between the support and the phosphor layer.

9 Claims, 8 Drawing Sheets

RADIATION IMAGE STORAGE PANEL

This application is a continuation of Ser. No. 06/918,356, filed Oct. 14, 1986, now abandoned.

BACKGROUND OF THE INVENTION

1. Field of the Invention

The present invention relates to a radiation image storage panel employed in a radiation image recording and reproducing method utilizing a stimulable phosphor.

2. Description of the Prior Art

For obtaining a radiation image, there has been conventionally employed a radiography utilizing a combination of a radiographic film having an emulsion layer containing a photosensitive silver salt material and an intensifying screen. As a method replacing the conventional radiography, a radiation image recording and reproducing method utilizing a stimulable phosphor as described, for instance, in U.S. Pat. No. 4,239,968, has been recently paid much attention. In this method, a radiation image storage panel comprising a stimulable phosphor (i.e., stimulable phosphor sheet) is used, and the method involves steps of causing the stimulable phosphor of the panel to absorb radiation energy having passed through an object or having radiated from an object; sequentially exciting the stimulable phosphor with an electromagnetic wave such as visible light or infrared rays (hereinafter referred to as "stimulating rays") to release the radiation energy stored in the phosphor as light emission (stimulated emission); photoelectrically detecting the emitted light to obtain electric signals; and reproducing the radiation image of the object as a visible image from the electric signals.

In the radiation image recording and reproducing method, a radiation image is obtainable with a sufficient amount of information by applying a radiation to an object at considerably smaller dose, as compared with the conventional radiography. Accordingly, this method is of great value especially when the method is used for medical diagnosis.

The radiation image storage panel employed in the above-described method has a basic structure comprising a support and a phosphor layer provided on one surface of the support. Further, a transparent film of a polymer material is generally provided on the free surface (surface not facing the support) of the phosphor layer to keep the phosphor layer from chemical deterioration or physical shock.

The phosphor layer comprises a binder and stimulable phosphor particles dispersed therein. The stimulable phosphor emits light (gives stimulated emission) when excited with an electromagnetic wave (stimulating rays) such as visible light or infrared rays after having been exposed to a radiation such as X-rays. Accordingly, the radiation having passed through an object or radiated from an object is absorbed by the phosphor layer of the panel in proportion to the applied radiation dose, and a radiation image of the object is produced in the panel in the form of a radiation energy-stored image. The radiation energy-stored image can be released as stimulated emission by sequentially irradiating (scanning) the panel with stimulating rays. The stimulated emission is then photoelectrically detected to give electric signals, so as to reproduce a visible image from the electric signals.

The radiation image recording and reproducing method is very useful for obtaining a radiation image as a visible image as described hereinbefore, and it is desired for the radiation image storage panel employed in the method to have a high sensitivity and provide an image of high quality (high sharpness, high graininess, etc.), as well as the radiographic intensifying screen employed in the conventional radiography.

When the radiation image recording and reproducing method is practically carried out, the radiation image storage panel is repeatedly used in a cyclic procedure comprising steps of exposing the panel to a radiation (i.e., recording a radiation image), irradiating the panel with stimulating rays (i.e., reading out the recorded radiation image), and exposing the panel to light for erasure (i.e., erasing the remaining energy from the panel). The panel is moved from one step to the next step, being held by the transfer means such as rolls and endless belt, and after one cycle is finished, the panel is usually piled upon other panels and stored in the radiation image recording and reproducing apparatus having said cyclic system.

From the viewpoint of flexibility required in transferring the radiation image storage panel, plastic films such as a polyethylene terephthalate film or various papers are desirably employed as a support material.

In the repeated use of the radiation image storage panel involving transferring and piling, a front surface (phosphor layer-side surface or protective film-side surface) and a back surface (support-side surface) of the panel, both of which are usually composed of polymer materials or papers, are apt to be electrically charged with minus and plus, respectively, by physical contact such as rubbing of a front surface of a panel against a back surface of another panel, rubbing of a front surface or back surface of a panel against an edge of another panel, or rubbing a panel surface against transfer means such as roll and belt, when the panel is piled on the other panels or moved from the pile to the transfer system. Thus electrically charged panel causes various problems in performing the radiation image recording and reproducing method.

For instance, the electrically charging of the panel surfaces tends to bring about adhesion of the front surface of a panel to the back surface of another panel, so that it is difficult to separate the panels in the direction parpendicular to the panel surface and the combined two panels are moved together to the transfer system, whereby the subsequent procedure cannot be performed normally. Further, the dust in the air also tends to deposit to the charged panel surface. A radiation image is generally read out from the phosphor layer-side surface of the panel, and the dust deposited panel surface causes scattering of the stimulating rays in the read-out procedure. As a result, the quality of resulting image tends to be extremely deteriorated. In addition to these drawbacks, the sensitivity of the panel decreases, a noise such as static marks is produced on the resulting image, and shocks are given to handlers thereof, because of the discharge of the panel.

There has been known the art that a light-absorbing material such as carbon black is incorporated into the support made of plastic film for improving the image quality such as sharpness. However, the amount of the incorporated carbon black for said purpose is very small, and the electrification of the panel cannot be prevented sufficiently even if the panel is provided with the support containing carbon black. For example, a commercially available panel provided with the support containing carbon black (trade name: Fuji CR Imaging Plate ST, available from Fuji Photo Film Co., Ltd.) has an electric resistivity of not lower than $10^{15}$ ohm on the support-side surface. It has been also proposed to incorporate a light-reflecting material such as titanium dioxide, aluminium oxide, silicon oxide or zinc oxide into the plastic support for enhancing the sensitivity of the panel, as described in Japanese patent application No. 57(1982)-182111. Further, Japanese Patent Publication No. 56(1981)-12600 discloses that a light-reflecting layer comprising a white pigment such as titanium white, white lead, zinc sulfide, aluminium oxide or magnesium oxide is provided between the support and the phosphor layer for enhancing the sensitivity of the panel.

SUMMARY OF THE INVENTION

It is an object of the present invention to provide a radiation image storage panel improved in an antistatic property.

The object can be accomplished by (1) a radiation image storage panel comprising a support made of plastic film or paper and a phosphor layer provided on the support which comprises a binder and a stimulable phosphor dispersed therein, characterized in that an antistatic layer which comprises a conductive material and has a surface resistivity of not higher than $10^{11}$ ohm is provided on the surface of the support not facing the phosphor layer; and (2) a radiation image storage panel comprising a support made of plastic film or paper and a phosphor layer provided on the support which comprises a binder and a stimulable phosphor dispersed therein, characterized in that an antistatic layer which comprises at least one conductive material selected from the group consisting of metal oxides, carbon black and conductive organic compounds and has a surface resistivity of not higher than $10^{12}$ ohm is provided between the support and the phosphor layer.

In the present invention, the surface (electric) resistivity means a value measured at a temperature of 23° C. and a humidity of 53% RH.

According to the present invention, an antistatic layer which comprises a conductive material is provided on the surface of the support of the radiation image storage panel (i.e., back surface of the panel), or between the support and the phosphor layer, whereby various troubles caused by the electrification of both surfaces of the panel, particularly the read-out-side surface (i.e., phosphor layer-side surface), can be effectively prevented. That is, the transfer properties of the panel can be improved and the deposit of dust to the panel surface can be reduced during the repeated use of the panel comprising transferring and piling in the radiation image recording and reproducing device.

More in detail, provision of a thin film comprising a conductive material (antistatic layer) and having a surface resistivity of not higher than $10^{11}$ ohm on the back surface of the panel, and alternatively provision of a thin film comprising a specific conductive material and having a surface resistivity of not higher than $10^{12}$ ohm between the support and the phosphor layer, can prominently prevent various troubles caused by the electrically charging of the phosphor layer-side surface. The reason is presumably that electric lines of force which have extended outwards from the electric charge gathering on the phosphor layer-side surface as to the conventional panel are to advance to the inside of the panel (in the direction of the back surface of the panel), that is, the electric lines of force are closed, owing to the conductive material contained in the thin film, whereby the panel is in such a state as if the phosphor layer-side surface thereof were not electrically charged.

Accordingly, adsorbability of the phosphor layer-side surface of the panel depending on the static electricity is reduced. Usually, the panel is pulled in the direction parpendicular to its surface by means of a sucker and separated from other panels in the piling state, to be moved to the transfer system in the apparatus. It can be prevented in the invention that two panels in the piling state are moved together in the superposed form to the transfer system. Further, it can be prevented that the dust deposits to the phosphor layer-side surface. The discharge from the panel surface can be remarkably reduced, and the panel can avoid the decrease of sensitivity, the production of noise (uneveness of image density) to lower the image quality and the shocks against the workers.

Furthermore, the inventors have found that too low surface resistivity of the antistatic layer provided between the support and the phosphor layer of the panel brings about increase of apparent friction between two superposed panels, so that it is hard to slide the panel from the other panel towards the direction of panel surface. More in detail, in such an apparatus that a panel is moved from the piling to the transfer system by shearing along the panel surface and simultaneous pulling in the direction parpendicular thereto, a considerable force is needed to move the panel having the antistatic layer at a low level of the surface resistivity. It happens that such panel is not moved to the transfer system. In addition, it is liable that the acception or release (especially, acception) of electric charges occurs at the edges of the panel and that shocks are given to workers in contact with the panel edge.

In the invention, particularly the panel having the antistatic layer of surface resistivity of not lower than $10^{7}$ ohm between the support and the phosphor layer can be effectively prevented from such hardness of separation of panels in the shearomg direction and from the shocks owing to the in-and-out of electric charges.

DETAILED DESCRIPTION OF THE INVENTION

Figure 1:
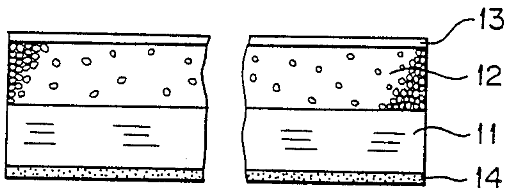
FIG. 1 and FIG. 2 are sectional views showing embodiments of the radiation image storage panel according to the present invention.
Figure 2:
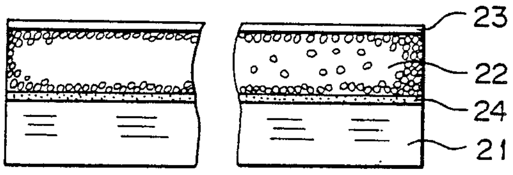

FIGS. 1 and 2 are sectional views schematically illustrating two embodiments of the radiation image storage panel according to the present invention.

In FIG. 1, the radiation image storage panel comprises a support 11, a phospor layer 12 comprising a binder and a stimulable phosphor dispersed therein, a protective film 13, superposed in this order, and an antistatic layer 14 provided on the surface of the support 11 not facing the phosphor layer.

In FIG. 2, the radiation image storage panel comprises a support 21, a phosphor layer 22 comprising a binder and a stimulable phosphor dispersed therein, a protective film 23, superposed in this order, and an antistatic layer 24 provided between the support 21 and the phosphor layer 22.

These structures are embodiments of the radiation image storage panel of the invention, and they are given by no means to restrict the present invention. For example, other optional layers such as an intermediate layer and a protective layer may be provided to the abovementioned structures.

The radiation image storage panel of the present invention in which the antistatic layer is probided on the support as shown in FIG. 1 can be prepared, for instance, in the following manner.

Examples of the support material include plastic films such as films of cellulose acetate, polyester, polyethylene terephthalate, polyamide, polyimide, triacetate and polycarbonate; and a variety of papers such as ordinary papers, baryta paper, resin-coated papers, pigment papers containing titanium dioxide or the like, and papers sized with polyvinyl alcohol or the like. From the viewpoint of characteristics of a radiation image storage panel as an information recording material and handling thereof, a plastic film is preferably employed as the support material in the invention. The plastic film may contain a light-absorbing material such as carbon black, or may contain a light-reflecting material such as titaniun dioxide. The former is appropriate for preparing a high-sharpness type radiation image storage panel, while the latter is appropriate for preparing a high-sensitivity type radiation image storage panel.

In the preparation of a known radiation image storage panel, one or more additional layers are occasionally provided between the support and the phosphor layer, so as to enhance the adhesion between the support and the phosphor layer, or to improve the sensitivity of the panel or the quality of an image (sharpness and graininess) provided thereby. For instance, a subbing layer may be provided by coating a polymer material such as gelatin over the surface of the support. Otherwise, a light-reflecting layer may be provided by forming a polymer material layer containing a light-reflecting material such as titanium dioxide. In the invention, one or more of these additional layers may be provided on the support.

As described in Japanese Patent Provisional Publication No. 58(1983)-200200 (corresponding to U.S. patent application No. 496,278), the phosphor layer-side surface of the support (or the surface of a subbing layer or light-reflecting layer in the case that such layers are provided on the support) may be provided with protruded and depressed portions for enhancement of the sharpness of the image.

On the support, a phosphor layer is formed. The phosphor layer basically comprises a binder and stimulable phosphor particles dispersed therein.

The stimulable phosphor, as described hereinbefore, gives stimulated emission when excited with stimulating rays after exposure to a radiation. From the viewpoint of practical use, the stimulable phosphor is desired to give stimulated emission in the wavelength region of 300–500 nm when excited with stimulating rays in the wavelength region of 400–900 nm.

Examples of the stimulable phosphor employable in the radiation image storage panel of the present invention include:

SrS:Ce,Sm, SrS:Eu,Sm, $ThO_2$:Er, and $La_2O_2S$:Eu,Sm, as described in U.S. Pat. No. 3,859,527;

ZnS:Cu,Pb, $BaO.xAl_2O_3$:Eu, in which x is a number satisfying the condition of $0.8 \leqq x \leqq 10$, and $M^{2+}O.xSiO_2$:A, in which $M^{2+}$ is at least one divalent metal selected from the group consisting of Mg, Ca, Sr, Zn, Cd and Ba, A is at least one element selected from the group consisting of Ce, Tb, Eu, Tm, Pb, Tl, Bi and Mn, and x is a number satisfying the condition of $0.5 \leqq x \leqq 2.5$, as described in U.S. Pat. No. 4,236,078;

$(Ba_{1-x-y}, Mg_x, Ca_y)FX:aEu^{2+}$, in which X is at least one element selected from the group consisting of Cl and Br, x and y are numbers satisfying the conditions of $0 < x+y \leqq 0.6$ and $xy \neq 0$, and a is a number satisfying the condition of $10^{-6} \leqq a \leqq 5 \times 10^{-2}$, as described in Japanese Patent Provisional Publication No. 55(1980)-12143;

LnOX:xA, in which Ln is at least one element selected from the group consisting of La, Y, Gd and Lu, X is at least one element selected from the group consisting of Cl and Br, A is at least one element selected from the group consisting of Ce and Tb, and x is a number satisfying the condition of $0 < x < 0.1$, as described in U.S. Pat. No. 4,236,078;

$(Ba_{1-x}, M^{II}_x)FX:yA$, in which $M^{II}$ is at least one divalent metal selected from the group consisting of Mg, Ca, Sr, Zn and Cd, X is at least one element selected from the group consisting of Cl, Br and I, A is at least one element selected from the group consisting of Eu, Tb, Ce, Tm, Dy, Pr, Ho, Nd, Yb and Er, and x and y are numbers satisfying the conditions of $0 \leqq x \leqq 0.6$ and $0 \leqq y \leqq 0.2$, respectively, as described in U.S. Pat. No. 4,239,968;

$M^{II}FX.xA:yLn$, in which $M^{II}$ is at least one element selected from the group consisting of Ba, Ca, Sr, Mg, Zn and Cd; A is at least one compound selected from the group consisting of BeO, MgO, CaO, SrO, BaO, ZnO, $Al_2O_3$, $Y_2O_3$, $La_2O_3$, $In_2O_3$, $SiO_2$, $TiO_2$, $ZrO_2$, $GeO_2$, $SnO_2$, $Nb_2O_5$, $Ta_2O_5$ and $ThO_2$; Ln is at least one element selected from the group consisting of Eu, Tb, Ce, Tm, Dy, Pr, Ho, Nd, Yb, Er, Sm and Gd; X is at least one element selected from the group consisting of Cl, Br and I; and x and y are numbers satisfying the conditions of $5 \times 10^{-5} \leqq x \leqq 0.5$ and $0 < y \leqq 0.2$, respectively, as described in Japanese Patent Provisional Publication No. 55(1980)-160078;

$(Ba_{1-x}, M^{II}_x)F_2.aBaX_2:yEu,zA$, in which $M^{II}$ is at least one element selected from the group consisting of Be, Mg, Ca, Sr, Zn and Cd; X is at least one element selected from the group consisting of Cl, Br and I; A is at least one element selected from the group consisting of Zr and Sc; and a, x, y and z are numbers satisfying the conditions of $0.5 \leqq a \leqq 1.25$, $0 \leqq x \leqq 1$, $10^{-6} \leqq y \leqq 2 \times 10^{-1}$, and $0 < z \leqq 10^{-2}$, respectively, as described in Japanese Patent Provisional Publication No. 56(1981)-116777;

$(Ba_{1-x},M^{II}_x)F_2.aBaX_2:yEu,zB$, in which $M^{II}$ is at least one element selected from the group consisting of Be, Mg, Ca, Sr, Zn and Cd; X is at least one element selected from the group consisting of Cl, Br and I; and a, x, y and z are numbers satisfying the conditions of $0.5 \leqq a \leqq 1.25$, $0 \leqq x \leqq 1$, $10^{-6} \leqq y \leqq 2 \times 10^{-1}$, and $0 < z \leqq 2 \times 10^{-1}$, respectively, as described in Japanese Patent Provisional Publication No. 57(1982)-23673;

$(Ba_{1-x},M^{II}_x)F_2.aBaX_2:yEu,zA$, in which $M^{II}$ is at least one element selected from the group consisting of Be, Mg, Ca, Sr, Zn and Cd; X is at least one element selected from the group consisting of Cl, Br and I; A is at least one element selected from the group consisting of As and Si; and a, x, y and z are numbers satisfying the conditions of $0.5 \leqq a \leqq 1.25$, $0 \leqq x \leqq 1$, $10^a \leqq 1.25$, $0 \leqq x \leqq 1$, $10^{-6} \leqq y \leqq 2 \times 10^{-6} \leqq y \leqq 2 \times 10^{-1}$, and $0 < z \leqq 5 \times 10^{-1}$, respectively, as described in Japanese Patent Provisional Publication No. 57(1982)-23675;

$M^{III}OX:xCe$, in which $M^{III}$ is at least one trivalent metal selected from the group consisting of Pr, Nd, Pm, Sm, Eu, Tb, Dy, Ho, Er, Tm, Yb, and Bi; X is at least one element selected from the group consisting of Cl and Br; and x is a number satisfying the condition of $0 < x < 0.1$, as described in Japanese Patent Provisional Publication No. 58(1983)-69281;

$Ba_{1-x}M_{x/2}L_{x/2}FX:yEu^{2+}$, in which M is at least one alkali metal selected from the group consisting of Li, Na, K, Rb and Cs; L is at least one trivalent metal selected from the group consisting of Sc, Y, La, Ce, Pr, Nd, Pm, Sm, Gd, Tb, Dy, Ho, Er, Tm, Yb, Lu, Al, Ga, In and Tl; X is at least one halogen selected from the group consisting of Cl, Br and I; and x and y are numbers satisfying the conditions of $10^{-2} \leqq x \leqq 0.5$ and $0 < y \leqq 0.1$, respectively, as described in U.S. patent application No. 497,805;

$BaFX.xA:yEu^{2+}$, in which X is at least one halogen selected from the group consisting of Cl, Br and I; A is at least one fired product of a tetrafluoroboric acid compound; and x and y are numbers satisfying the conditions of $10^{-6} \leqq x \leqq 0.1$ and $0 < y \leqq 0.1$, respectively, as described in U.S. patent application No. 520,215;

$BaFX.xA:yEu^{2+}$, in which X is at least one halogen selected from the group consisting of Cl, Br and I; A is at least one fired product of a hexafluoro compound selected from the group consisting of monovalent and divalent metal salts of hexafluoro silicic acid, hexafluoro titanic acid and hexafluoro zirconic acid; and x and y are numbers satisfying the conditions of $10^{-6} \leqq x \leqq 0.1$ and $0 < y \leqq 0.1$, respectively, as described in U.S. patent application No. 502,648;

$BaFX.xNaX':aEu^{2+}$, in which each of X and X' is at least one halogen selected from the group consisting of Cl, Br and I; and x and a are numbers satisfying the conditions of $0 < x \leqq 2$ and $0 < a \leqq 0.2$, respectively, as described in Japanese Patent Provisional Publication No. 59(1984)-56479;

$M^{II}FX.xNaX':yEu^{2+}:zA$, in which $M^{II}$ is at least one alkaline earth metal selected from the group consisting of Ba, Sr and Ca; each of X and X' is at least one halogen selected from the group consisting of Cl, Br and I; A is at least one transition metal selected from the group consisting of V, Cr, Mn, Fe, Co and Ni; and x, y and z are numbers satisfying the conditions of $0 < x \leqq 2$, $0 < y \leqq 0.2$ and $0 < z \leqq 10^{-2}$, respectively, as described in U.S. patent application No. 535,928;

$M^{II}FX.aM^IX'.bM'^{II}X''_2.cM^{III}X'''_3.xA:yEu^{2+}$, in which $M^{II}$ is at least one alkaline earth metal selected from the group consisting of Ba, Sr and Ca; $M^I$ is at least one alkali metal selected from the group consisting of Li, Na, K, Rb and Cs; $M'^{II}$ is at least one divalent metal selected from the group consisting of Be and Mg; $M^{III}$ is at least one trivalent metal selected from the group consisting of Al, Ga, In and Tl; A is metal oxide; X is at least one halogen selected from the group consisting of Cl, Br and I; each of X', X'' and X''' is at least one halogen selected from the group consisting of F, Cl, Br and I; a, b and c are numbers satisfying the conditions of $0 \leqq a \leqq 2$, $0 \leqq b \leqq 10^{-2}$, $0 \leqq c \leqq 10^{-2}$ and $a+b+c \geqq 10^{-6}$; and x and y are numbers satisfying the conditions of $0 < x \leqq 0.5$ and $0 < y \leqq 0.2$, respectively, as described in U.S. patent application No. 543,326;

$M^{II}X_2.aM^{II}X'_2:xEu^{2+}$, in which $M^{II}$ is at least one alkaline earth metal selected from the group consisting of Ba, Sr and Ca; each of X and X' is at least one halogen selected from the group consisting of Cl, Br and I, and $X \neq X'$; and a and x are numbers satisfying the conditions of $0.1 \leqq a \leqq 10.0$ and $0 < x \leqq 0.2$, respectively, as described in U.S. patent application No. 660,987;

$M^{II}FX.aM^IX':xEu^{2+}$, in which $M^{II}$ is at least one alkaline earth metal selected from the group consisting of Ba, Sr and Ca; $M^I$ is at least one alkali metal selected from the group consisting of Rb and Cs; X is at least one halogen selected from the group consisting of Cl, Br and I; X' is at least one halogen selected from the group consisting of F, Cl, Br and I; and a and x are numbers satisfying the conditions of $0 \leqq a \leqq 4.0$ and $0 < x \leqq 0.2$, respectively, as described in U.S. patent application No. 668,464; and $M^IX:xBi$, in which $M^I$ is at least one alkali metal selected from the group consisting of Rb and Cs; X is at least one halogen selected from the group consisting of Cl, Br and I; and x is a number satisfying the condition of $0 < x \leqq 0.2$, as described in U.S. patent application No. 846,919.

The $M^{II}X_2.aM^{II}X'_2:Eu^{2+}$ phosphor described in the above-mentioned U.S. patent application No. 660,987 may contain the following additives in the following amount per 1 mol of $M^{II}X_2.aM^{II}X'_2$:

$bM^IX''$, in which $M^I$ is at least one alkali metal selected from the group consisting of Rb and Cs; X'' is at least one halogen selected from the group consisting of F, Cl, Br and I; and b is a number satisfying the condition of $0 < b \leqq 10.0$, as described in U.S. patent application No. 699,325;

$bKX''.cMgX'''_2.dM^{III}X''''_3$, in which $M^{III}$ is at least one trivalent metal selected from the group consisting of Sc, Y, La, Gd and Lu; each of X'', X''' X'''' is at least one halogen selected from the group consisting of F, Cl, Br and I; and b, c and d are numbers satisfying the conditions of $0 \leqq b \leqq 2.0$, $0 \leqq c \leqq 2.0$, $0 \leqq d \leqq 2.0$ and $2 \times 10^{-5} \leqq b+c+d$, as described in U.S. patent application No. 723,819;

yB, in which y is a number satisfying the condition of $2 \times 10^{-4} \leqq y \leqq 2 \times 10^{-1}$, as described in U.S. patent application No. 727,974;

bA, in which A is at least one oxide selected from the group consisting of $SiO_2$ and $P_2O_5$; and b is a number satisfying the condition of $10^{-4} \leqq b \leqq 2 \times 10^{-1}$, as described in U.S. patent application No. 727,972;

bSiO, in which b is a number satisfying the condition of $0 < b \leqq 3 \times 10^{-2}$, as described in U.S. patent application No. 797,971;

$bSnX''_2$, in which X'' is at least one halogen selected from the group consisting of F, Cl, Br and I; and b is a number satisfying the condition of $0<b\leqq 10^{-3}$, as described in U.S. patent application Ser. No. 797,971;

$bCsX''.cSnX'''_2$, in which each of X'' and X''' is at least one halogen selected from the group consisting of F, Cl, Br and I; and b and c are numbers satisfying the conditions of $0<b\leqq 10.0$ and $10^{-6}\leqq c\leqq 2\times 10^{-2}$, respectively, as described in U.S. patent application Ser. No. 850,715; and $bCsX''.yLn^{3+}$, in which X'' is at least one halogen selected from the group consisting of F, Cl, Br and I; Ln is at least one rare earth element selected from the group consisting of Sc, Y, Ce, Pr, Nd, Sm, Gd, Tb, Dy, Ho, Er, Tm, Yb and Lu; and b and y are numbers satisfying the conditions of $0<b\leqq 10.0$ and $10^{-6}\leqq y\leqq 1.8\times 10^{-1}$, respectively, as described in U.S. patent application Ser. No. 850,715.

Among the above-described stimulable phosphors, the divalent europium activated alkaline earth metal halide phosphor and rare earth element activated rare earth oxyhalide phosphor are particularly preferred, because these phosphors show stimulated emission of high luminance. The above-described stimulable phosphors are given by no means to restrict the stimulable phosphor employable in the present invention. Any other phosphors can be also employed, provided that the phosphor gives stimulated emission when excited with stimulating rays after exposure to a radiation.

Examples of the binder to be contained in the phosphor layer include: natural polymers such as proteins (e.g. gelatin), polysaccharides (e.g. dextran) and gum arabic; and synthetic polymers such as polyvinyl butyral, polyvinyl acetate, nitrocellulose, ethylcellulose, vinylidene chloride-vinyl chloride copolymer, polyalkyl (meth) acrylate, vinyl chloride-vinyl acetate copolymer, polyurethane, cellulose acetate butyrate, polyvinyl alcohol, and linear polyester. Particularly preferred are nitrocellulose, linear polyester, polyalkyl (meth)acrylate, a mixture of nitrocellulose and linear polyester, and a mixture of nitrocellulose and polyalkyl (meth)acrylate. These binders may be crosslinked with a crosslinking agent.

The phosphor layer can be formed on the support, for instance, by the following procedure.

In the first place, the above-described stimulable phosphor and binder are added to an appropriate solvent, and then they are mixed to prepare a coating dispersion comprising the phosphor particles homogeneously dispersed in the binder solution.

Examples of the solvent employable in the preparation of the coating dispersion include lower alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower alcohols with lower aliphatic acids such as methyl acetate, ethyl acetate and butyl acetate; ethers such as dioxane, ethylene glycol monoethylether and ethylene glycol monomethyl ether; and mixtures of the above-mentioned compounds.

The ratio between the binder and the stimulable phosphor in the coating dispersion may be determined according to the characteristics of the aimed radiation image storage panel and the nature of the phosphor employed. Generally, the ratio therebetween is within the range of from 1:1 to 1:100 (binder:phosphor, by weight), preferably from 1:8 to 1:40.

The coating dispersion may contain a dispersing agent to improve the dispersibility of the phosphor particles therein, and may contain a variety of additives such as a plasticizer for increasing the bonding between the binder and the phosphor particles in the phosphor layer. Examples of the dispersing agent include phthalic acid, stearic acid, caproic acid and a hydrophobic surface active agent. Examples of the plasticizer include phosphates such as triphenyl phosphate, tricresyl phosphate and diphenyl phosphate; phthalates such as diethyl phthalate and dimethoxyethyl phthalate; glycolates such as ethylphthalyl ethyl glycolate and butylphthalyl butyl glycolate; and polyesters of polyethylene glycols with aliphatic dicarboxylic acids such as polyester of triethylene glycol with adipic acid and polyester of diethylene glycol with succinic acid.

The coating dispersion containing the phosphor particles and the binder prepared as described above is applied evenly onto the surface of the support to form a layer of the coating dispersion. The coating procedure can be carried out by a conventional method such as a method using a doctor blade, a roll coater or a knife coater.

After applying the coating dispersion onto the support, the coating dispersion is then heated slowly to dryness so as to complete the formation of a phosphor layer. The thickness of the phosphor layer varies depending upon the characteristics of the aimed radiation image storage panel, the nature of the phosphor, the ratio between the binder and the phosphor, etc. Generally, the thickness of the phosphor layer is within the range of from 20 $\mu$m to 1 mm, and preferably from 50 to 500 $\mu$m.

The phosphor layer can be provided onto the support by the methods other than that given in the above. For instance, the phosphor layer is initially prepared on a sheet (false support) such as a glass plate, metal plate or plastic sheet using the aforementioned coating dispersion and then thus prepared phosphor layer is superposed on the genuine support by pressing or using an adhesive agent.

On the surface of the phosphor layer not facing the support, a transparent protective film may be provided to protect the phosphor layer from physical and chemical deterioration.

The protective film can be provided onto the phosphor layer by coating the surface of the phosphor layer with a solution of a transparent polymer such as a cellulose derivative (e.g. cellulose acetate or nitrocellulose), or a synthetic polymer (e.g. polymethyl methacrylate, polyvinyl butyral, polyvinyl formal, polycarbonate, polyvinyl acetate, or vinyl chloride-vinyl acetate copolymer), and drying the coated solution. Alternatively, the transparent film can be provided onto the phosphor layer by beforehand preparing it from a polymer such as polyethylene terephthalate, polyethylene, polyvinylidene chloride or polyamide, followed by placing and fixing it onto the phosphor layer with an appropriate adhesive agent. The transparent protective film preferably has a thickness within the range of approximately 3 to 20 $\mu$m.

On the surface of the support not facing the phosphor layer (namely, on the back surface of the radiation image storage panel) is provided an antistatic layer which is a characteristic requisite of the present invention.

The antistatic layer comprises a conductive material. The antistatic layer may be substantially composed of only the conductive material, or may be composed of a binder and fine particles of the conductive material dispersed in the binder. The antistatic layer is required to have a surface resistivity of not higher than $10^{11}$ ohm, and preferably not higher than $10^8$ ohm, from the viewpoint of the static electrification of the panel surface, etc. The surface resistivity used herein means a value measured at a temperature of 23° C. and a humidity of 53% RH.

As a conductive material, there are for example employed metals, metal oxides, carbon black and conductive organic compounds.

Examples of the metal include aluminium, copper and nickel. As the metal oxides, $In_2O_3$, $SnO_2$ and ITO (mixed crystal of $In_2O_3$ and $SnO_2$) are employed. These metal oxides may contain a variety of dopants in an appropriate amount and a representative example thereof is antimony-containing tin dioxide ($SnO_2/Sb$). Examples of the conductive material include anionic activators such as guanidine derivatives, phosphorus-containing anionic activators and sulfonic acids; cationic activators such as quaternary ammonium salts, pyridinium salts, imidazoline derivatives and morpholine derivatives; and nonionic activators such as polyethylene glycol and alkylolamide.

The above-described conductive materials except the metal oxides are given by no means to restrict the material employable for the preparation of an antistatic layer in the present invention. Any other materials can be also employed, provided that the material has a conductivity and the layer prepared therefrom has antistatic properties.

When the metals are used, the antistatic layer can be formed on the surface of the support, for instance, by directly combining a thin metal sheet with the support using an adhesive agent; or by previously laminating the metal sheet on an appropriate synthetic resin film and combining the metal-laminated film with the support in the same manner. Alternatively, a metal is vapor-deposited to an appropriate synthetic resin film through a method such as vacuum vapor deposition and the metal-deposited film is combined with the support in the same manner as described above. Preferred metal is aluminium from the viewpoint of processing characteristics, etc. Also using the metal oxides, the antistatic layer can be formed by the vapor deposition method.

When any one of carbon black, the metal oxides and the conductive organic compounds is used, the antistatic layer can be formed on the support as follows. The particulate conductive material is dissolved or dispersed together with a binder (synthetic resin) in an appropriate solvent to prepare a coating dispersion (or solution), and the coating dispersion is applied to the surface of the support using a conventional coating method. Using fine particles of the metal, the antistatic layer can be also formed in the same manner as described above.

It is required to uniformly disperse the fine particles of conductive material in the antistatic layer (binder) for giving an excellent antistatic effect. Examples of such a binder include synthetic resins such as polypropylene, polyethylene, polycarbonate, polyester and polyethylene terephthalate. Particularly preferred are polypropylene, polyester and polyethylene terephthalate.

The amount of the conductive material contained in the antistatic layer varies depending upon the kind of the conductive material, and generally is in the range of 0.5–100% by weight of the binder. The thickness of the antistatic layer is generally in the range of from 1 to 50 μm.

In the radiation image storage panel of the present invention, the antistatic layer may be provided between the support and the phosphor layer (see: FIG. 2). The antistatic layer can be formed on the surface of the support to be provided with a phosphor layer (or on the suraface of the light-reflecting layer in the case that such layer is provided on the support) by using the above-described materials and in the same manner as described above. Then, a phosphor layer is formed on the resulting antistatic layer.

In this case, the antistatic layer has a surface resistivity of not higher than $10^{12}$ ohm from the viewpoint of the static electrification of panel surfaces, etc, and preferably not lower than $10^7$ ohm from the viewpoint of the easiness of sliding a panel towards the shearing direction. The conductive material employable for the formation of the antistatic layer is limited to the above-mentioned metal oxides, carbon black and the conductive organic compounds. (The conductive organic compounds are not limited to the above-mentioned compounds, and any other organic compounds can be also employed provided that the compound has a conductivity and the layer prepared therefrom has antistatic properties.)

In thus prepared radiation image storage panel having the antistatic layer on the support surface or between the support and the phosphor layer, the electrification phenomenon can be effectively prevented. As a result, the transfer properties of the panel is improved and the phosphor layer-side surface of the panel can be prevented from the deposition of dust to improve the image quality.

The support-side surface of the radiation image storage panel (surface of the antistatic layer or surface of the support) may be further provided with a protective layer such as a friction-reducing layer in order to protect the panel surface (support-side surface of the panel) from damage, as described in U.S. Pat. No. 4,572,955. The friction-reducing layer comprises a plastic film having a relatively low friction coefficient.

Figure 3:
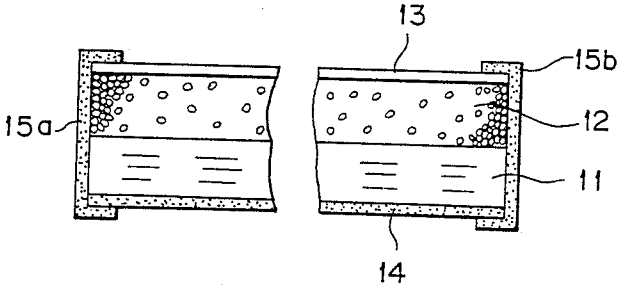
FIG. 3 and FIG. 4 are sectional views showing other embodiments of the radiation image storage panel according to the present invention.
Figure 4:
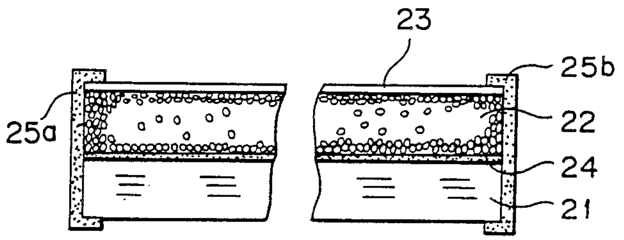

The radiation image storage panel may be covered on at least one side surface thereof with a polymer material containing a conductive material, if desired. The covering is preferably made on the side surfaces at the front and back of the panel viewed along the direction of transferring the panel, as shown in FIGS. 3 and 4 (15*a*, 15*b* and 25*a*, 25*b* represent conductive polymer films). The antistatic effect can be further improved by providing the conductive polymer films on the side surfaces. That is, the conductive polymer films of the panel easily take a contact with the transfer means during the transfer procedure, and thereby the electric charges which are apt to be stored inside of the panel can be smoothly released outside thereof through the contact.

The radiation image storage panel of the invention may be colored with a colorant to enhance the sharpness of the resulting image, as described in U.S. Pat. No. 4,394,581 and U.S. patent application No. 326,642. For the same purpose, the radiation image storage panel of the invention may contain a white powder in the phosphor layer, as described in U.S. Pat. No. 4,350,893.

The following examples further illustrate the present invention, but these examples are understood to by no means restrict the invention.

EXAMPLE 1

To a mixture of a particulate divalent europium activated barium fluorobromide ($BaFBr:0.001Eu^{2+}$) phosphor and a linear polyester resin were added successively methyl ethyl ketone and nitrocellulose (nitration degree: 11.5%), to prepare a dispersion containing the phosphor particles. Subsequently, tricresyl phosphate, n-butanol and methyl ethyl ketone were added to the dispersion. The mixture was sufficiently stirred by means of a propeller agitator to obtain a homogeneous coating dispersion having a mixing ratio of 1:20 (binder:phosphor, by weight) and a viscosity of 25–35 PS (at 25° C.).

The coating dispersion was applied evenly onto a polyethylene terephthalate sheet (support, thickness: 250 μm) placed horizontally on a glass plate. The application of the coating dispersion was carried out using a doctor blade. After the coating was complete, the support having a layer of the coating dispersion was placed in an oven and heated at a temperature gradually rising from 25° to 100° C. Thus, a phosphor layer having a thickness of 250 μm was formed on the support.

On the phosphor layer was placed a transparent polyethylene terephthalate film (thickness: 12 μm; provided with a polyester adhesive layer on one surface) to combine the transparent film and the phosphor layer with the adhesive layer.

Subsequently, a high-pressure polyethylene film vapor-deposited with aluminium (thickness of the aluminium-depositing layer: 1 μm) was combined with the surface of the support not facing the phosphor layer using an adhesive agent to form an antistatic layer.

Thus, a radiation image storage panel consisting essentially of an antistatic layer, a support, a phosphor layer and a transparent protective film, superposed in this order, was prepared. (see: FIG. 1)

EXAMPLE 2

The procedure of Example 1 was repeated except for using a polypropylene film containing carbon black (amount of carbon black against the amount of binder: 15 % by weight, thickness: 30 μm) instead of the aluminium-deposited high-pressure polyethylene film, to prepare a radiation image storage panel consisting essentially of an antistatic layer, a support, a phosphor layer and a transparent protective film, superposed in this order.

EXAMPLE 3

The procedure of Example 1 was repeated except that a homogeneous coating dispersion comprising a polyester resin and antimony-containing tin dioxide ($SnO_2/Sb$) dispersed therein (amount of $SnO_2/Sb$ against the amount of binder: 50 % by weight) was evenly applied onto the surface of the support using a doctor blade to form an antistatic layer having a thickness of 10 μm, instead of providing the aluminium-deposited high-pressure polyethylene film, to prepare a radiation image storage panel consisting essentially of an antistatic layer, a support, a phosphor layer and a transparent protective film, superposed in this order.

EXAMPLE 4

The procedure of Example 3 was repeated except for using a conductive organic compound of cationic (imidazoline derivative, amount of imidazoline derivative against the amount of binder: 2 % by weight) instead of antimony-containing tin dioxide, to prepare a radiation image storage panel consisting essentially of an antistatic layer, a support, a phosphor layer and a transparent protective film, superposed in this order.

COMPARISON EXAMPLE 1

The procedure of Example 1 was repeated except for using an orientated polypropylene film not containing a conductive material (thickness: 20 μm) instead of the aluminium-deposited high-pressure polyethylene film, to prepare a radiation image storage panel consisting essentially of a plastic film layer, a support, a phosphor layer and a transparent protective film, superposed in this order.

COMPARISON EXAMPLE 2

The procedure of Example 1 was repeated except for not providing an antistatic layer on the surface of the support, to prepare a radiation image storage panel consisting essentially of a support, a phosphor layer and a transparent protective film.

The prepared radiation image storage panels were evaluated on the surface resistance (1) and the transfer properties (2) according to the following tests.

(1) Surface resistance

Each of the plastic films for the formation of an antistatic layer (or plastic film layer) (Examples 1 and 2 and Comparison Example 1), the supports having the antistatic layers (Examples 3 and 4), and the support only (Comparison Example 2) was cut to give a test strip at a size of 110 mm × 110 mm. The test strip was placed on a circular electrode (P-601 type, manufactured by Kawaguchi Electric Seisakusho Co., Ltd.) provided with an insulation resistance tester (EV-40 type super-insulation resistance tester, manufactured by the same) and then the voltage was impressed to measure the electric resistance of surface (SR) of the test strip at a temperature of 23° C. and at a humidity of 50 % RH.

The results are set forth in Table 1.

TABLE 1

| | | Surface Resistivity (ohm) |
|---|---|---|
| Example 1 | Aluminium-deposited high-pressure polyethylene film | $10^3$ |
| Example 2 | Carbon black-containing polypropylene film | $10^3$ |
| Example 3 | $SnO_2/Sb$-containing polyester resin layer | $10^8$ |
| Example 4 | Imidazoline derivative-containing polyester resin layer | 10 |
| Com. Example 1 | Orientated polypropylene film | $10^{14}$ |
| Com. Example 2 | Carbon black-containing support | $10^{16}$ |

As is evident from the results set forth in Table 1, each of the antistatic layers of the radiation image storage panels according to the present invention (Examples 1–4) had the surface resistivity of not higher than $10^{11}$ ohm and showed low static characteristics. On the other hand, each of the plastic film layer not containing a conductive material and the carbon black-containing support of the radiation image storage panels for comparison (Comparison Examples 1 and 2) had the surface resistivity of not lower than $10^{14}$ ohm and showed high static characteristics.

(2) Transfer properties

Figure 5:
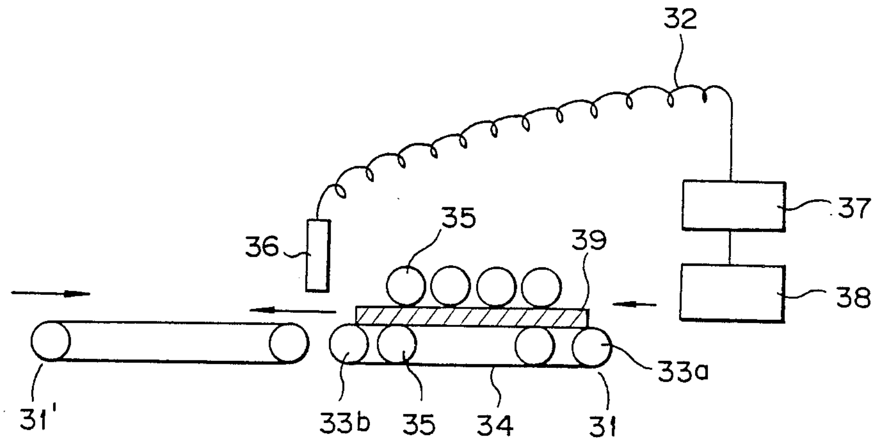
FIG. 5 shematically shows a static testing machine for evaluating the transfer properties of a radiation image storage panel.

The test in the transfer properties was done by the use of a static testing machine shown in FIG. 5.

FIG. 5 is a schematic view of the static testing machine.

In FIG. 5, the static testing machine comprises transfer means 31, 31' and an electric potential measuring means 32. Each of the transfer means 31, 31' comprises rolls 33*a*, 33*b* made of urethane rubber, an endless belt 34 which is drawn by the rolls and assisting rolls 35 made of phenol resin. The electric potential measuring means 32 comprises a detector 36, a voltage indicator 37 connected to the detector 36 and a recorder 38.

The evaluation of the transfer properties of the radiation image storage panel was carried out in the following manner. The panel 39 was introduced onto the transfer means 31, 31' of the testing machine, where the panel 39 was repeatedly transferred in right and left directions (directions indicated by arrows). After a certain number of transfer was finished, the surface of the panel (protective film-side surface of the panel) was brought into contact with the detector 36 to measure the surface potential (KV) of the panel.

Figure 6:
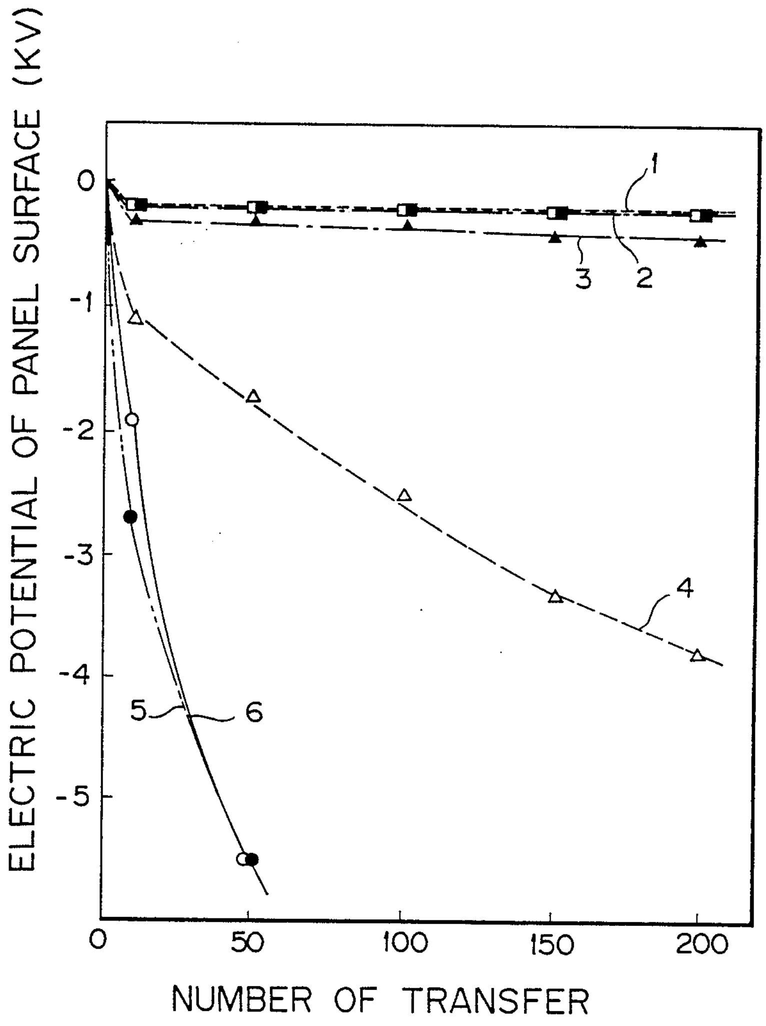
FIG. 6 and FIG. 8. graphically show relationships between the number of transfer and the electric potential of panel surface with respect to the radiation image storage panels.
Figure 7:
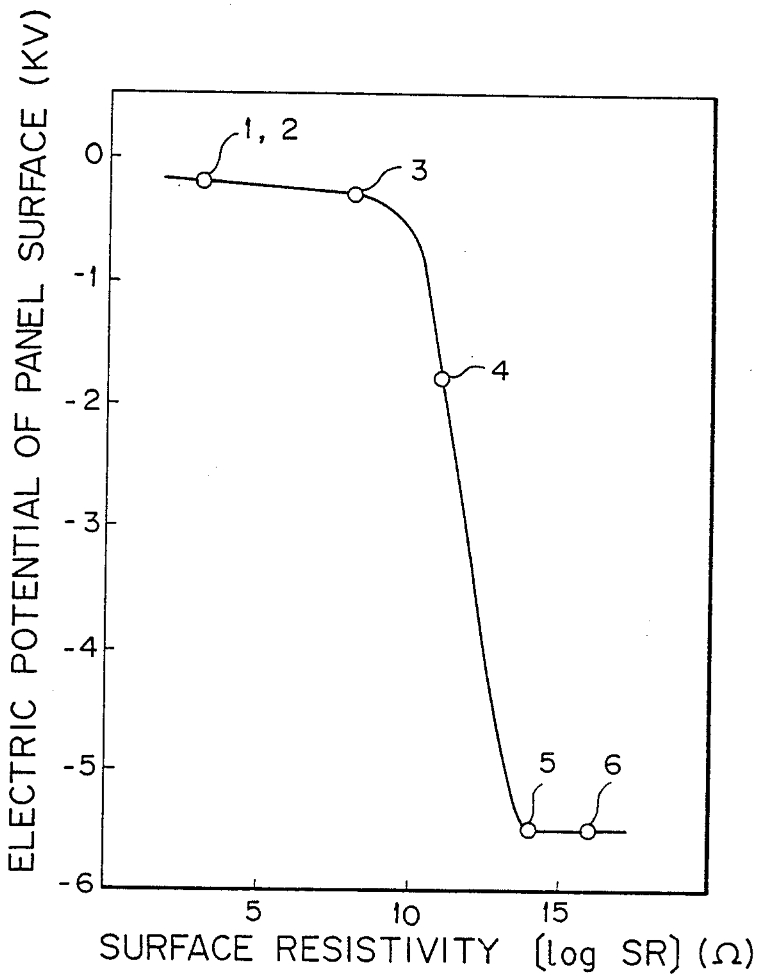
FIG. 7 and FIG. 9 graphically show relationships between the surface resistivity and the electric potential of panel surface with respect to the radiation image storage panels.

The results are shown in FIGS. 6 and 7.

FIG. 6 shows a graph in which the electric potential of panel surface is plotted as ordinate and the number of transfer as abscissa with respect to each of the radiation image storage panels.

In FIG. 6, Curves 1 to 6 are respectively correspond to the radiation image storage panels having the following layers on the back surfaces thereof:

Curve 1: an antistatic layer of aluminium-deposited high-pressure polyethylene film (Example 1);

Curve 2: an antistatic layer of carbon black-containing polypropylene film (Example 2);

Curve 3: an antistatic layer of $SnO_2$/Sb-containing polyester resin (Example 3);

Curve 4: an antistatic layer of imidazoline derivative-containing polyester resin (Example 4);

Curve 5: a layer of orientated polypropylene film not containing a conductive material (Comparison Example 1) and;

Curve 6: no layer is provided (Comparison Example 2).

FIG. 7 shows a graph in which the electric potential of panel surface when each of the panels was transferred 50 times is plotted as ordinate and the surface resistivity of the antistatic layer (or any of the plastic film layer and the support) as abscissa. The surface resistivity is expressed by a logarithmic value.

In FIG. 7, the measuring points 1 to 6 indicated in the graph correspond to Curves 1 to 6 (Examples 1 to 4 and Comparison Examples 1 and 2) shown in FIG. 6, respectively.

As is evident from FIG. 6, the radiation image storage panels of the invention having the antistatic layers on the back surfaces (Curves 1 to 4) showed small variation of the electric potential of panel surface (protective film-side surface) with the increase of the number of transfer to give the excellent antistatic effect. Particularly, the radiation image storage panels using aluminium, carbon black or antimony-containing tin dioxide as the conductive material (Curves 1, 2 and 3) had the electric potentials as high as the electric potential (0 KV) measured before the panels were transferred, being almost constant. On the other hand, the radiation image storage panel having the plastic film layer not containing a conductive material (Curve 5) and the radiation image storage panel not having an antistatic layer (Curve 6) showed remarkable variation of the electric potential with the increase of the number of transfer, that is, the panels were highly charged.

As is evident from FIG. 7, the radiation image storage panels of the invention having the antistatic layers (Points 1 to 4) showed small potential difference of the panel surface as well as the low surface resistance of the antistatic layer. On the contrary, the radiation image storage panel having the plastic film layer not containing a conductive material (Point 5) and the radiation image storage panel not having an antistatic layer (Point 6) showed large potential difference of the panel surface as well as the high surface resistance of the plastic film layer or the support.

Accordingly, it was confirmed from the results shown in FIGS. 6 and 7 that the radiation image storage panels of the present invention (Curves 1–4 and Points 1–4) had highly antistatic properties, which depended upon the surface resistivity ($\leqq 10^{11}$ ohm) of the antistatic layers.

EXAMPLE 5

A polypropylene film containing carbon black (amount of carbon black against the amount of binder: 15% by weight, thickness: 30 μm) was combined with a polyethylene terephthalate sheet (support, thickness: 250 μm) placed horizontally on a glass plate using an adhesive agent to form an antistatic layer on the support.

To a mixture of a particulate divalent europium activated barium fluorobromide ($BaFBr:0.001Eu^{2+}$) phosphor and a linear polyester resin were added successively methyl ethyl ketone and nitrocellulose (nitration degree: 11.5%), to prepare a dispersion containing the phosphor particles. Subsequently, tricresyl phosphate, n-butanol and methyl ethyl ketone were added to the dispersion. The mixture was sufficiently stirred by means of a propeller agitator to obtain a homogeneous coating dispersion having a mixing ratio of 1:20 (binder : phosphor, by weight) and a viscosity of 25–35 PS (at 25 ° C.).

The coating dispersion was applied evenly onto the surface of the antistatic layer on the support by using a doctor blade. After the coating was complete, the support having a layer of the coating dispersion was placed in an oven and heated at a temperature gradually rising from 25° to 100° C. Thus, a phosphor layer having a thickness of 250 μm was formed on the antistatic layer.

On the phosphor layer was placed a transparent polyethylene terephthalate film (thickness: 12 μm; provided with a polyester adhesive layer on one surface) to combine the transparent film and the phosphor layer with the adhesive layer.

Thus, a radiation image storage panel consisting essentially of a support, an antistatic layer, a phosphor layer and a transparent protective film, superposed in this order, was prepared. (see: FIG. 2)

EXAMPLE 6

The procedure of Example 5 was repeated except that a homogeneous coating dispersion comprising an acrylic resin and antimony-containing tin dioxide ($SnO_2$/Sb) dispersed therein (amount of $SnO_2$/Sb against the amount of binder: 50% by weight) was evenly applied onto the surface of the support using a doctor blade to form an antistatic layer having a thickness of 10 μm, instead of providing the carbon black-containing polypropylene film, to prepare a radiation image storage panel consisting essentially of a support, an antistatic layer, a phosphor layer and a transparent protective film, superposed in this order.

EXAMPLE 7

The procedure of Example 6 was repeated except for using a conductive organic compound of cationic (imidazoline derivative, amount of imidazoline derivative against the amount of binder: 2% by weight) instead of antimony-containing tin dioxide, to prepare a radiation image storage panel consisting essentially of a support, an antistatic layer, a phosphor layer and a transparent protective film, superposed in this order.

EXAMPLE 8

Carbon black was added to polyester (trade name: Vilon 30P, available from Toyobo Co., Ltd.) insoluble in methyl ethyl ketone and they were mixed using ball mill, to prepare a homogeneous coating dispersion (amount of carbon black against the amount of solid content of polyester: 50% by weight).

The procedure of Example 5 was repeated except that said coating dispersion was evenly applied onto the surface of the support using a doctor blade to form an antistatic layer having a thickness of approx. 20 μm, instead of providing the carbon black-containing polypropylene film, to prepare a radiation image storage panel consisting essentially of a support, an antistatic layer, a phosphor layer and a transparent protective film, superposed in this order.

EXAMPLE 9

The procedure of Example 8 was repeated except for using carbon black of 30% by weight in the amount against the amount of solid content of polyester in the coating dispersion, to prepare a radiation image storage panel consisting essentially of a support, an antistatic layer, a phosphor layer and a transparent protective film, superposed in this order.

EXAMPLE 10

The procedure of Example 8 was repeated except for using carbon black of 15% by weight in the amount against the amount of solid content of polyester in the coating dispersion, to prepare a radiation image storage panel consisting essentially of a support, an antistatic layer, a phosphor layer and a transparent protective film, superposed in this order.

EXAMPLE 11

The procedure of Example 8 was repeated except for using carbon black of 10% by weight in the amount against the amount of solid content of polyester in the coating dispersion, to prepare a radiation image storage panel consisting essentially of a support, an antistatic layer, a phosphor layer and a transparent protective film, superposed in this order.

COMPARISON EXAMPLE 3

The procedure of Example 5 was repeated except for using an orientated polypropylene film not containing a conductive material (thickness: 20 μm) instead of the carbon black-containing polypropylene film, to prepare a radiation image storage panel consisting essentially of a support, a plastic film layer, a phosphor layer and a transparent protective film, superposed in this order.

COMPARISON EXAMPLE 4

The procedure of Example 5 was repeated except for not providing an antistatic layer on the support, to prepare a radiation image storage panel consisting essentially of a support, a phosphor layer and a transparent protective film.

The radiation image storage panels prepared in Examples 5 to 11 and Comparison Examples 3 and 4 were evaluated on the above-mentioned surface resistance (1) and the transfer properties (2).

(1) Surface resistance

Each of the plastic films for the formation of an antistatic layer (or plastic film layer) (Example 5 and Comparison Example 3), the supports having the antistatic layers (Examples 6 to 11), and the support only (Comparison Example 4) was measured on the electric resistance of surface (SR) in the same manner as described above.

The results are set forth in Table 2.

TABLE 2

| | | Surface Resistivity (ohm) |
|---|---|---|
| Example 5 | Carbon black-containing polypropylene film | $10^5$ |
| Example 6 | $SnO_2$/Sb-containing acrylic resin layer | $10^8$ |
| Example 7 | Imidazoline derivative-containing acrylic resin layer | $10^{11}$ |
| Example 8 | Carbon black-containing polyester layer (50 wt %) | $10^7$ |
| Example 9 | Carbon black-containing polyester layer (30 wt %) | $10^8$ |
| Example 10 | Carbon black-containing polyester layer (15 wt %) | $10^{11}$ |
| Example 11 | Carbon black-containing polyester layer (10 wt %) | $10^{12}$ |
| Com. Example 3 | Orientated polypropylene film | $10^{14}$ |
| Com. Example 4 | Carbon black-containing support | $10^{16}$ |

As is evident from the results set forth in Table 2, each of the antistatic layers of the radiation image storage panels according to the present invention (Examples 5–11) had the surface resistivity of not higher than $10^{12}$ ohm and showed low static characteristics. On the other hand, each of the plastic film layer not containing a conductive material and the carbon black-containing support of the radiation image storage panels for comparison (Comparison Examples 3 and 4) had the surface resistivity of not lower than $10^{14}$ ohm and showed high static characteristics.

(2) Transfer properties

The radiation image storage panels were evaluated on the transfer properties by the use of the static testing machine shown in FIG. 5 in the same manner as described above.

Figure 8:
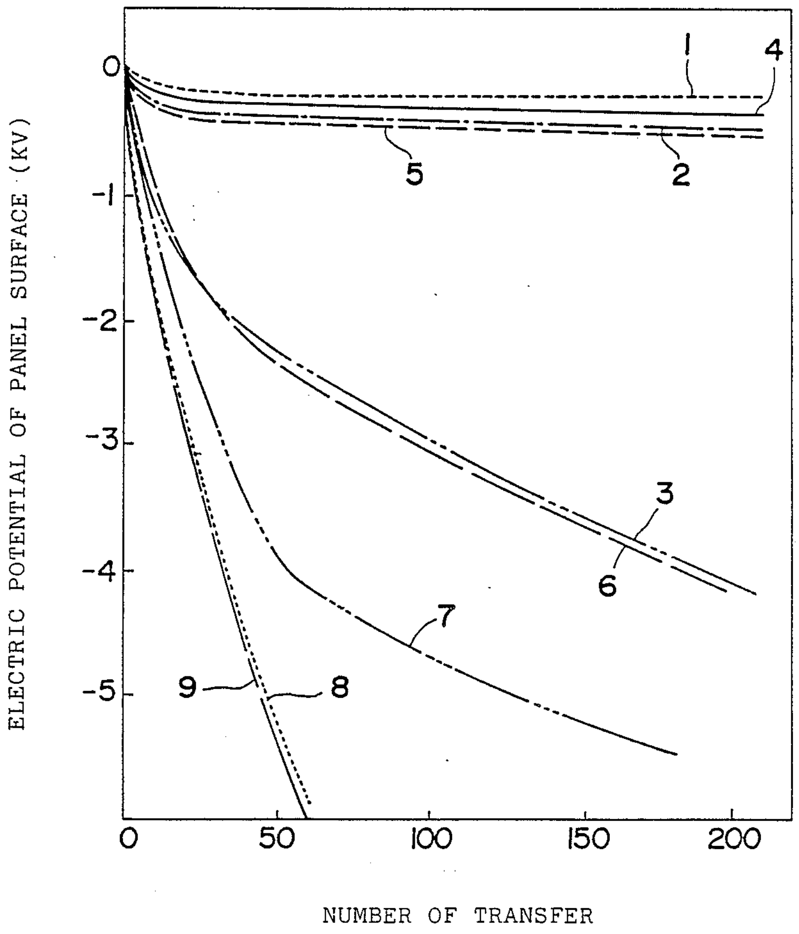
Figure 9:
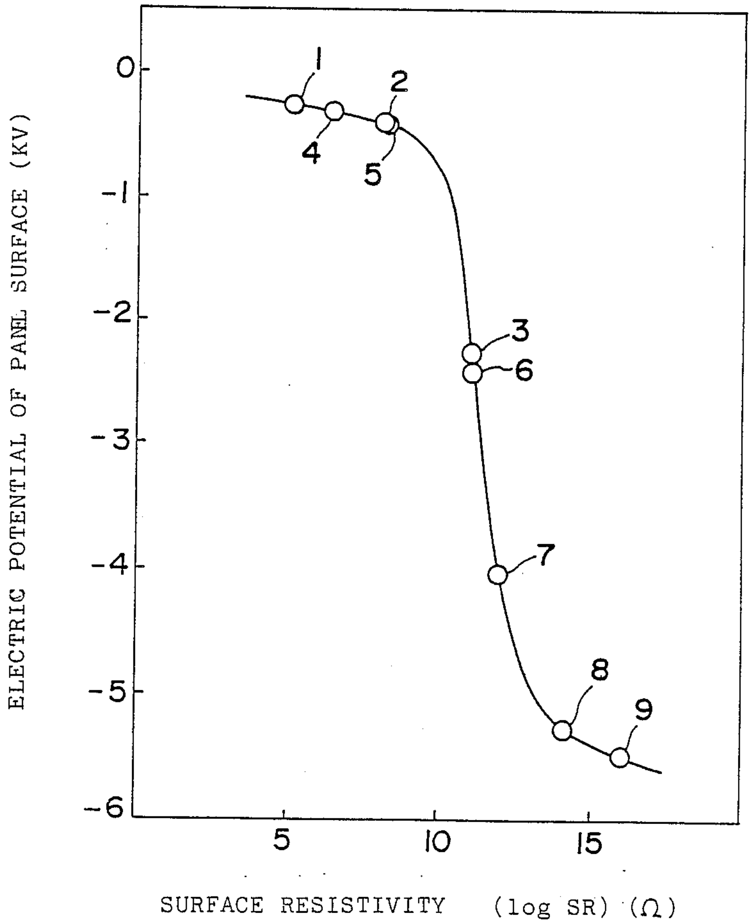

The results are shown in FIGS. 8 and 9.

FIG. 8 shows a graph in which the electric potential of panel surface is plotted as ordinate and the number of transfer as abscissa with respect to each of the radiation image storage panels.

In FIG. 8, Curves 1 to 9 are respectively correspond to the radiation image storage panels having the following layers on the back surfaces thereof:

Curve 1: an antistatic layer of carbon black-containing polypropylene film (Example 5);

Curve 2: an antistatic layer of $SnO_2$/Sb-containing acrylic resin (Example 6);

Curve 3: an antistatic layer of imidazoline derivative-containing acrylic resin (Example 7);

Curve 4: an antistatic layer of 50 wt% carbon black-containing polyester (Example 8);

Curve 5: an antistatic layer of 30 wt% carbon black-containing polyester (Example 9);

Curve 6: an antistatic layer of 15 wt% carbon black-containing polyester (Example 10);

Curve 7: an antistatic layer of 10 wt% carbon black-containing polyester (Example 11);

Curve 8: a layer of orientated polypropylene film not containing a conductive material (Comparison Example 3) and;

Curve 9: no layer is provided (Comparison Example 4).

FIG. 9 shows a graph in which the electric potential of panel surface when each of the panels was transferred 50 times is plotted as ordinate and the surface resistivity of the antistatic layer (or any of the plastic film layer and the support) as abscissa. The surface resistivity is expressed by a logarithmic value.

In FIG. 9, the measuring points 1 to 9 indicated in the graph correspond to Curves 1 to 9 (Examples 5 to 11 and Comparison Examples 3 and 4) shown in FIG. 8, respectively.

As is evident from FIG. 8, the radiation image storage panels of the invention having the antistatic layers between the support and the phosphor layer (Curves 1 to 7) showed not so large variation of the electric potential of panel surface (protective film-side surface) with the increase of the number of transfer to give the good antistatic effect, as compared with the radiation image storage panel having the plastic film layer not containing a conductive material (Curve 8) and the radiation image storage panel not having an antistatic layer (Curve 9). Particularly, the radiation image storage panels using carbon black or antimony-containing tin dioxide as the conductive material (Curves 1, 2, 4 and 5) had the electric potentials as high as the electric potential (0 KV) measured before the panels were transferred, being almost constant.

As is evident from FIG. 9, the radiation image storage panels of the invention having the antistatic layers (Points 1 to 7) showed relatively small potential difference of the panel surface as well as the low surface resistance of the antistatic layer. On the contrary, the radiation image storage panel having the plastic film layer not containing a conductive material (Point 8) and the radiation image storage panel not having an antistatic layer (Point 9) showed large potential difference of the panel surface as well as the high surface resistance of the plastic film layer or the support.

Accordingly, it was confirmed from the results shown in FIGS. 8 and 9 that the radiation image storage panels of the present invention (Curves 1–7 and Points 1–7) had highly antistatic properties, which depended upon the surface resistivity ($\leqq 10^{12}$ ohm) of the antistatic layers.

The radiation image storage panels prepared in Examples 5 and 8 to 11 were evaluated on the tensile properties in the shearing direction (3).

(3) Tensile properties

Figure 10:
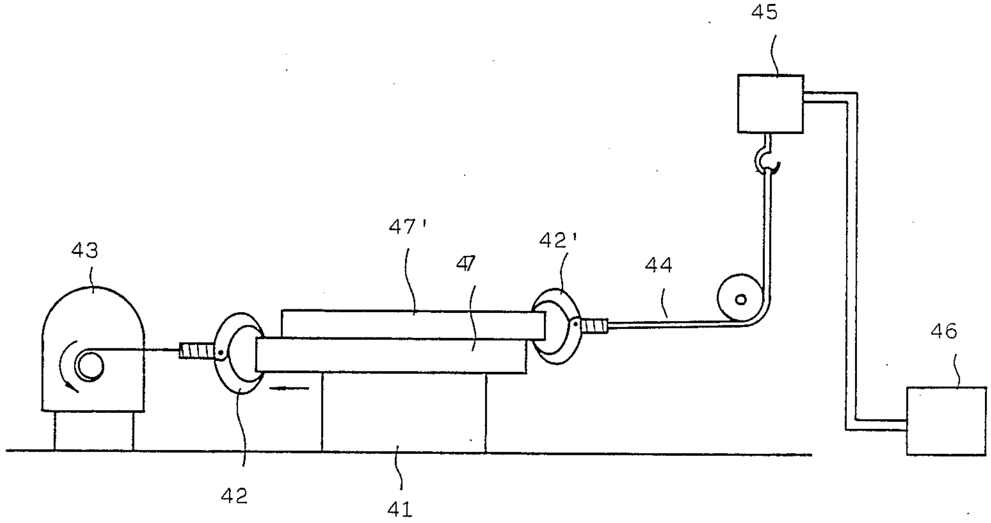
FIG. 10 schematically shows a tensile testing machine for evaluating the tensile properties of a radiation image storage panel.

The test in the tensile properties was done by the use of a tensile testing machine shown in FIG. 10.

FIG. 10 is a schematic view of the tensile testing machine.

In FIG. 10, the tensile testing machine comprises a insulation board 41 for placing two panels, nippers 42, 42' for holding a side part of a panel, constant-speed drive motor 43 connected to the nipper 42 for sliding a panel towards the shearing direction, and tensile measuring means connected to the other nipper 42'. The tensile measuring means comprises a metallic wire 44 for transmitting the tensile force loaded on the nipper 42 to a measuring device, a tensile force measuring device (loadcell) 45 and a recorder 46.

The radiation image storage panel was cut to give two test strips at a size of 100 mm×100 mm. One of the test strip 47 was transferred for 50 times by use of an apparatus similar to the above-described transfer means in the static testing machine and then placed on the insulation board 41. The other test strip 47' was transferred for 50 times in the same manner and immediately superposed on the strip 47. Subsequently, while the strip 47 was pulled towards the shearing direction at a rate of 50 mm/min. by means of the drive motor 43, tensile force (gw) loaded on the strip 47' was measured (the value of tensile force corresponds to an apparent dynamic friction force). The measurement was conducted at a temperature of 23° C. and at a humidity of 50 % RH.

Figure 11:
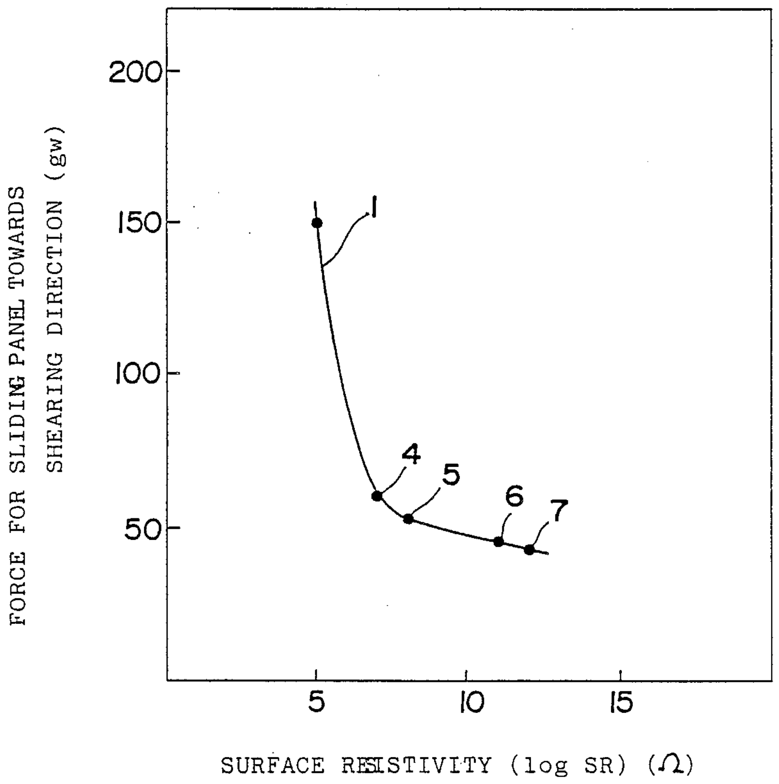
FIG. 11 graphically shows a relationship between the surface resistivity and the force for sliding panel towards shearing direction.

The results are shown in FIG. 11.

FIG. 11 shows a graph in which the force for sliding panel towards shearing direction is plotted as ordinate and the surface resistivity of the antistatic layer as abscissa with respect to each of the radiation image storage panels.

In FIG. 11, the measuring points 1 and 4 to 7 indicated in the graph correspond to Examples 5 and 8 to 11, respectively.

As is evident from FIG. 11, among the radiation image storage panels of the invention having the antistatic layers between the support and the phosphor layer, the panels wherein the surface resistivity of the anti-static layer were not lower than $10^7$ ohm (Points 4 to 7) showed remarkably small force to slide the panel towards the shearing direction, and it was easy to separate the two panels in said direction.

We claim:

1. A radiation image storage panel comprising a support made of (a) plastic film or paper, (b) a phosphor layer provided on the support which comprises a binder and a stimulable phosphor dispersed therein and (c) a protective layer disposed on the phosphor layer, characterized in that said radiation image storage panel includes only one antistatic layer which comprises at least one conductive material selected from the group consisting of metal oxides, carbon black and conductive organic compounds and has a surface resistivity of not higher than $10^{12}$ ohm and not lower than $10^7$ ohm, said antistatic layer being provided between the support and the phosphor layer.

2. The radiation image storage panel as claimed in claim 1, in which said antistatic layer comprises a vapor-deposited conductive material.

3. The radiation image storage panel as claimed in claim 1, in which said antistatic layer comprises a binder and a particulate conductive material dispersed therein.

4. The radiation image storage panel as claimed in claim 3, in which said conductive material is contained in the antistatic layer in an amount of 0.5–100% by weight of the binder of the antistatic layer.

5. The radiation image storage panel as claimed in claim 1, in which the side surfaces of said panel are covered with a polymer material containing a conductive material.

6. The radiation image storage panel as claimed in claim 1, wherein said antistatic layer comprises a binder and a particulate conductive material dispersed therein, said particulate conductive material being selected from the group consisting of $In_2O_3$, $SnO_2$, mixed crystal of $In_2O_3$ and $SnO_2$, $SnO_2/Sb$, and carbon black and said binder being selected from the group consisting of polypropylene, polyethylene, polyethylene terephthalate and acrylic resins.

7. A radiation image recording and reproducing method comprising the steps of:

applying radiation energy having passed through an object or having radiation from an object to a radiation image storage panel comprising a support made of (a) plastic film or paper, (b) a phosphor layer provided on the support which comprises a binder and a stimulable phosphor dispersed therein and (c) a protective layer disposed on the phosphor layer, characterized in that said radiation image storage panel includes only one antistatic layer which comprises at least one conductive material selected from the group consisting of metal oxides, carbon black and conductive organic compounds and has a surface resistivity of not higher than $10^{12}$ ohm and not lower than $10^7$ ohm, said antistatic layer being provided between the support and the phosphor layer, so that the radiation energy is absorbed by the stimulable phosphor, transferring the radiation image storage panel having the absorbed radiation energy therein to the following excitation stage using transfer means;

sequentially exciting the stimulable phosphor with an electromagnetic wave to release the radiation energy stored in the stimulable phosphor as light emission; and photoelectrically detecting the emitted light to obtain electric signal;

reproducing the radiation image of the object as a visible image from the electric signals, and said series of the stages being repeatedly performed.

8. The radiation image recording and reproducing method as claimed in claim 7, wherein said antistatic layer of the radiation image storage panel comprises a binder and a particulate conductive material dispersed therein, said particulate conductive material being selected from the group consisting of $In_2O_3$, $SnO_2$, mixed crystal of $In_2O_3$ and $SnO_2$, $SnO_2/Sb$, and carbon black and said binder being selected from the group consisting of polypropylene, polyethylene, polyethylene terepthalate, and acrylic resins.

9. The radiation image recording and reproducing method as claimed in claim 7, wherein a plurality of said radiation image storage panels are piled one on another between the stage of exciting the panel and the next stage of applying a radiation energy to the panel.

* * * * *